US012807538B2

(12) United States Patent
Mehr et al.

(10) Patent No.: US 12,807,538 B2
(45) Date of Patent: Nov. 24, 2026

(54) SYSTEMS AND METHODS FOR PRODUCING SILICON CARBIDE POWDER

(71) Applicant: HONEYWELL INTERNATIONAL INC., Charlotte, NC (US)

(72) Inventors: Mehrad Mehr, Morris Plains, NJ (US); Bahram Jadidian, Morris Plains, NJ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 881 days.

(21) Appl. No.: 18/053,031

(22) Filed: Nov. 7, 2022

(65) Prior Publication Data

US 2024/0150250 A1 May 9, 2024

(51) Int. Cl.
*C04B 35/628* (2006.01)
*C04B 35/52* (2006.01)

(52) U.S. Cl.
CPC ...... *C04B 35/62834* (2013.01); *C04B 35/522* (2013.01)

(58) Field of Classification Search
None
See application file for complete search history.

(56) References Cited

U.S. PATENT DOCUMENTS 4,565,711 A * 1/1986 Pinkhasov .............. C23C 14/26 118/727
6,129,887 A * 10/2000 Barnard ................ C04B 35/571 264/82
8,921,147 B2 * 12/2014 Allenic ............. H01L 21/02617 438/483
11,319,629 B2 * 5/2022 Fischer, III ............. C23C 16/01
2002/0144647 A1 10/2002 Golan
2006/0236937 A1 * 10/2006 Powell .............. H01L 21/02636 118/726
2009/0220788 A1 9/2009 Barrett et al.

FOREIGN PATENT DOCUMENTS

| | | | |
|---|---|---|---|
| CN | 104828825 | B | 12/2017 |
| CN | 109205625 | A | 1/2019 |
| CN | 111717918 | A | 9/2020 |
| CN | 114057196 | A | 2/2022 |
| EP | 0005359 | A1 | 11/1979 |
| EP | 3024962 | A1 | 6/2016 |
| WO | 2015012954 | A1 | 1/2015 |

* cited by examiner

*Primary Examiner* — Sylvia Macarthur
(74) *Attorney, Agent, or Firm* — Ingrassia Fisher & Lorenz LLP

(57) ABSTRACT

Methods and systems are provided for producing silicon carbide. The system comprises an enclosure configured to be maintained under vacuum conditions and at a processing temperature above a melting temperature of silicon, a vapor production system configured to supply a silicon vapor to the enclosure, and a transportation system configured to provide a stream of graphite powder into the enclosure, retain the graphite powder within the enclosure for a processing time sufficient to react the graphite powder with the silicon vapor to produce a silicon carbide powder, and then provide a stream of the silicon carbide powder out of the enclosure.

10 Claims, 5 Drawing Sheets

SYSTEMS AND METHODS FOR PRODUCING SILICON CARBIDE POWDER

TECHNICAL FIELD

The present invention generally relates to production of silicon carbide powders, and more particularly relates to systems and methods for producing silicon carbide powders by reacting graphite powder with silicon vapor under vacuum conditions.

BACKGROUND

Silicon carbide (SiC) powders, typically produced with an Acheson process, have been used in a variety of industries for decades. The Acheson process involves heating a mixture of silicon dioxide ($SiO_2$; e.g., silica, quartz sand, clay) and carbon (e.g., powdered coke) in a furnace. The silicon dioxide is melted surrounding graphite rods to form a core. An electric current is passed through the graphite rods which heats the mixture to 1700 to 2500° C. A carbothermic reaction occurs that produces a layer of silicon carbide around the graphite rods and emission of carbon monoxide (CO).

The Acheson process has several shortcomings. For example, the significant temperature requirements result in energy waste and a relatively large environmental/carbon footprint. In addition, the process is a batch process which adds to inefficiency and energy waste. Yet another shortcoming of the process is that sizes of the SiC particles produced are not easily controllable and therefore typically require further processing for particle size adjustments or refinements.

Hence, there is a need for systems and methods capable of producing silicon carbide powders with reduced energy waste, reduced production cost, improvements to efficiency, and/or improvements to product quality. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for producing silicon carbide. The system comprises an enclosure configured to be maintained under vacuum conditions and at a processing temperature above a melting temperature of silicon, a vapor production system configured to supply a silicon vapor to the enclosure, and a transportation system configured to provide a stream of graphite powder into the enclosure, retain the graphite powder within the enclosure for a processing time sufficient to react the graphite powder with the silicon vapor to produce a silicon carbide powder, and then provide a stream of the silicon carbide powder out of the enclosure.

A method is provided for producing silicon carbide. The method comprises maintaining an enclosure under vacuum conditions and at a processing temperature above a melting temperature of silicon, supplying a silicon vapor to the enclosure, providing a stream of graphite powder into the enclosure, retaining the graphite powder within the enclosure for a processing time sufficient to react the graphite powder with the silicon vapor to produce a silicon carbide powder, and providing a stream of the silicon carbide powder out of the enclosure.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
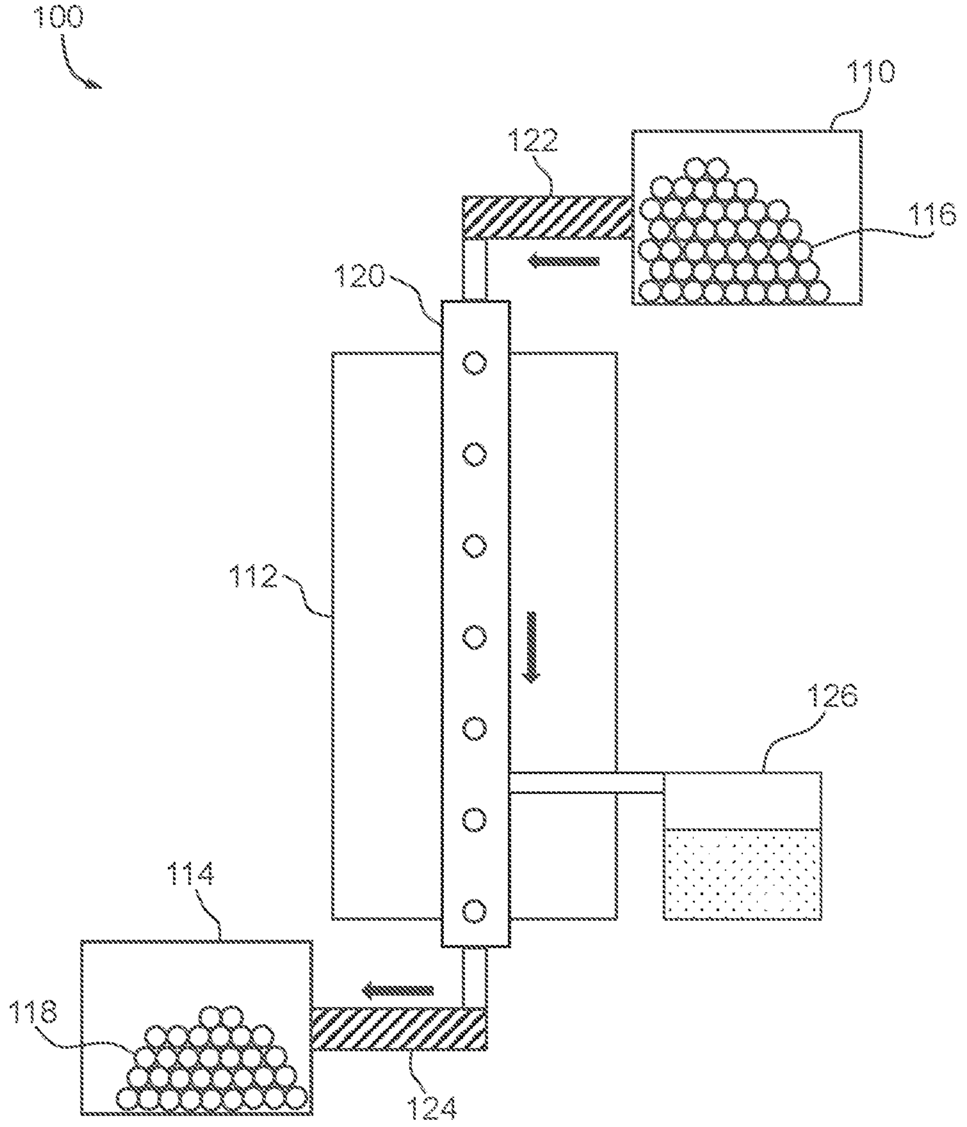
FIG. 1 is a diagram representing a first system for producing silicon carbide in accordance with various embodiments.

The following detailed description is merely exemplary in nature and is not intended to limit the invention or the application and uses of the invention. As used herein, the word “exemplary” means “serving as an example, instance, or illustration.” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Systems and methods disclosed herein provide for production of silicon carbide powders. The systems include a furnace or other structure having an enclosure configured to be maintained under vacuum conditions and at processing temperatures above a melting temperature of silicon (e.g., about 1410° C. at 1 atm). As used herein, vacuum conditions refer to a pressure within the enclosure of less than about 300 millitorr (about 40 Pa), such as between 300 and 50 millitorr (about 40 and 6 Pa), between 225 and 50 millitorr (about 30 and 6 Pa), or less than 175 millitorr (about 23 Pa). Exemplary processing temperatures include, but are not limited to, greater than 1410° C., such as between about 1450 and 1600° C., or between about 1480 and 1540° C.

A supply of graphite powder may be feed into the enclosure and contacted therein with a silicon vapor. The graphite powder reacts with the silicon vapor to produce a silicon carbide powder which may then be removed from the enclosure for collection. In various embodiments, the graphite powder may be retained within the enclosure for a processing time sufficient to entirely convert the graphite powder to the silicon carbide powder, that is, the resulting silicon carbide powder exiting the enclosure comprises equal to or greater than 95 percent silicon carbide, equal or greater than 98 percent silicon carbide, or equal to or greater than 99 percent silicon carbide. In various embodiments, the graphite powders may have particles sizes with diameters of less than about 40 μm, such as less than about 30 μm, or less than about 20 μm. In some embodiments, the graphite powders may have particles sizes with average diameters of less than about 20 μm, such as less than about 10 μm, less than 1 μm, less than about 500 nm, less than about 100 nm, or less than about 50 nm.

In various embodiments, the system may include a reservoir of molten silicon in fluidic communication with the enclosure configured to provide the silicon vapor to the enclosure in concentrations sufficient to convert the graphite powder to the silicon carbide. The volume of the molten silicon in the reservoir and the concentration of the silicon vapor in the enclosure required for such function may depend on the volume of the graphite powder in the enclosure and the time which the graphite powder remains within the enclosure in order to ensure that the graphite powder is adequately or entirely converted to the silicon carbide powder.

FIGS. 1-4 present various exemplary systems 100, 200, 300, 400 configured to produce the silicon carbide. However, it should be understood that the systems 100, 200, 300, 400 of FIGS. 1-4 may have structures other than those shown while maintaining the functionality described herein. Furthermore, the methods described herein may be performed with systems having arrangements different from the systems 100, 200, 300, 400 of FIGS. 1-4. Directions of movement of the powders within the systems 100, 200, 300, and 400 are generally indicated with arrows.

Referring now to FIG. 1, a first system 100 is provided for producing silicon carbide that includes a first container 110 configured to store a supply of graphite powder 116, a furnace 112 configured to be operated at elevated temperatures above the melting temperature of silicon and under vacuum conditions, and a second container 114 configured to receive a silicon carbide powder 118. A first auger 122 is configured to controllably transport the graphite powder 116 from the first container 110 to the furnace 112 and a second auger 124 is configured to controllably transport the silicon carbide powder 118 from the furnace 112 to the second container 114. During operation of the first system 100, the graphite powder 116 is input into the furnace 112 such that particles of the graphite powder 116 fall under the force of gravity through a cavity 120 from an upper end thereof to a lower end thereof. While in freefall, the particles react with silicon vapor within the cavity 120 to convert into particles of the silicon carbide powder 118. Preferably, the cavity 120 has a sufficient length such that the particles remain within the furnace 112 for a processing time sufficient to fully convert to the silicon carbide powder 118. The first system 100 includes a reservoir 126 configured to store a molten silicon in a manner such that the silicon vapor evaporating therefrom enters the cavity 120 of the furnace 112. Although not shown, the reservoir 126 may include an inlet configured to receive silicon (e.g., a silicon powder) from a source thereof and a heating element configured to melt the silicon. With this arrangement, the graphite powder 116 may be continuously poured into the furnace 112 to continuously produce the silicon carbide powder 118.

Figure 2:
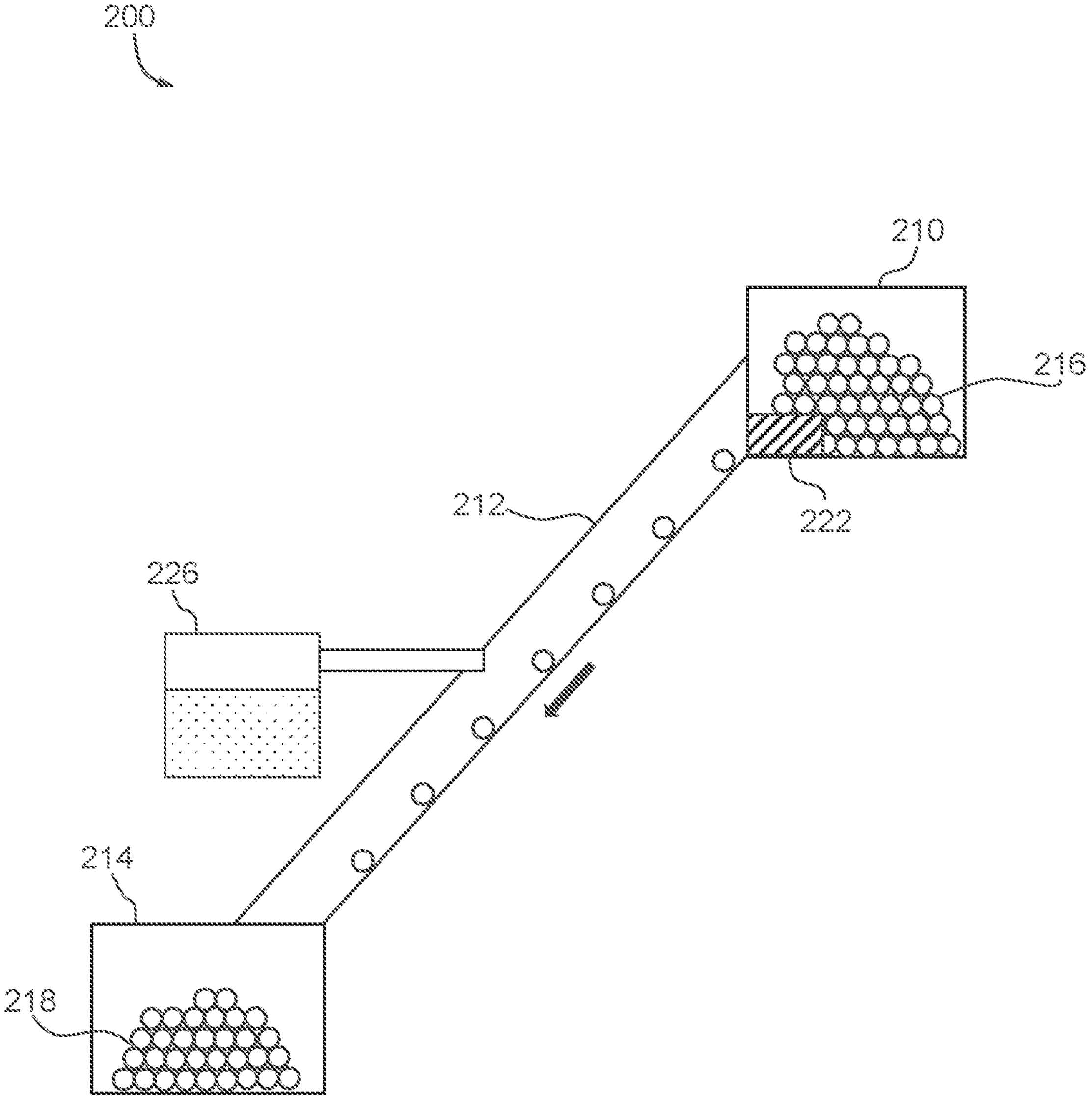
FIG. 2 is a diagram representing a second system for producing silicon carbide in accordance with various embodiments.

Referring now to FIG. 2, a second system 200 is provided for producing silicon carbide that includes a first container 210 configured to store a supply of graphite powder 216, a furnace 212 configured to be operated at elevated temperatures above the melting temperature of silicon and under vacuum conditions, and a second container 214 configured to receive a silicon carbide powder 218. A first auger 222 is configured to controllably transport the graphite powder 216 from the first container 210 to the furnace 212. Although not shown, a second auger may be provided that is configured to controllably transport the silicon carbide powder 218 from the furnace 212 to the second container 214. During operation of the second system 200, the graphite powder 216 is input into the furnace 212 such that particles of the graphite powder 116 slide along a chute of the furnace 212 from an upper end thereof to a lower end thereof. The particles may slide solely under the force of gravity, or may be assisted with, for example, vibrations applied to the chute. While sliding, the particles react with silicon vapor within the chute to convert into particles of the silicon carbide powder 218. Preferably, the chute has a sufficient length such that the particles remain within the furnace 212 for a processing time sufficient to fully convert to the silicon carbide powder 218. The second system 200 includes a reservoir 226 configured to store a molten silicon in a manner such that the silicon vapor evaporating therefrom enters the chute of the furnace 212. Although not shown, the reservoir 226 may include an inlet configured to receive silicon (e.g., a silicon powder) from a source thereof and a heating element configured to melt the silicon. With this arrangement, the graphite powder 216 may be continuously poured onto the chute to continuously produce the silicon carbide powder 218.

Figure 3:
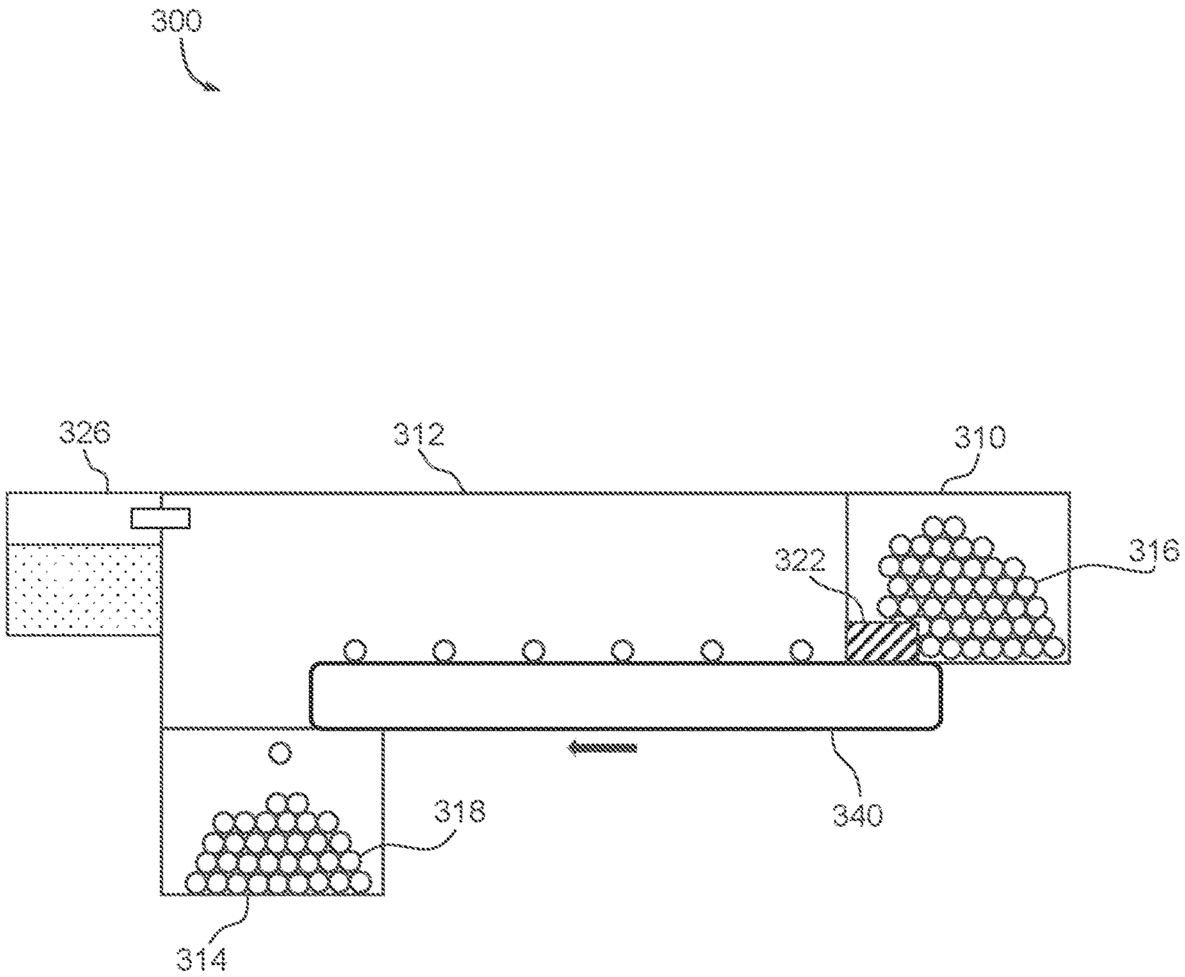
FIG. 3 is a diagram representing a third system for producing silicon carbide in accordance with various embodiments.

Referring now to FIG. 3, a third system 300 is provided for producing silicon carbide that includes a first container 310 configured to store a supply of graphite powder 316, a furnace 312 configured to be operated at elevated temperatures above the melting temperature of silicon and under vacuum conditions, and a second container 314 configured to receive a silicon carbide powder 318. A first auger 322 is configured to controllably transport the graphite powder 316 from the first container 310 to the furnace 312. Although not shown, a second auger may be provided that is configured to controllably transport the silicon carbide powder 318 from the furnace 312 to the second container 314. During operation of the third system 300, the graphite powder 316 is input into the furnace 312 such that particles of the graphite powder 316 are transported on a conveyor belt 340 from a first end thereof to a second end thereof. While being transported on the conveyor belt 340, the particles react with silicon vapor within a cavity of the furnace 312 to convert into particles of the silicon carbide powder 318. Preferably, the conveyor belt 340 has a sufficient length and/or speed such that the particles remain within the furnace 312 for a processing time sufficient to fully convert to the silicon carbide powder 318. The third system 300 includes a reservoir 326 configured to store a molten silicon in a manner such that the silicon vapor evaporating therefrom enters the cavity of the furnace 312. Although not shown, the reservoir 326 may include an inlet configured to receive silicon (e.g., a silicon powder) from a source thereof and a heating element configured to melt the silicon. With this arrangement, the graphite powder 316 may be continuously poured onto the conveyor belt 340 to continuously produce the silicon carbide powder 318.

Figure 4:
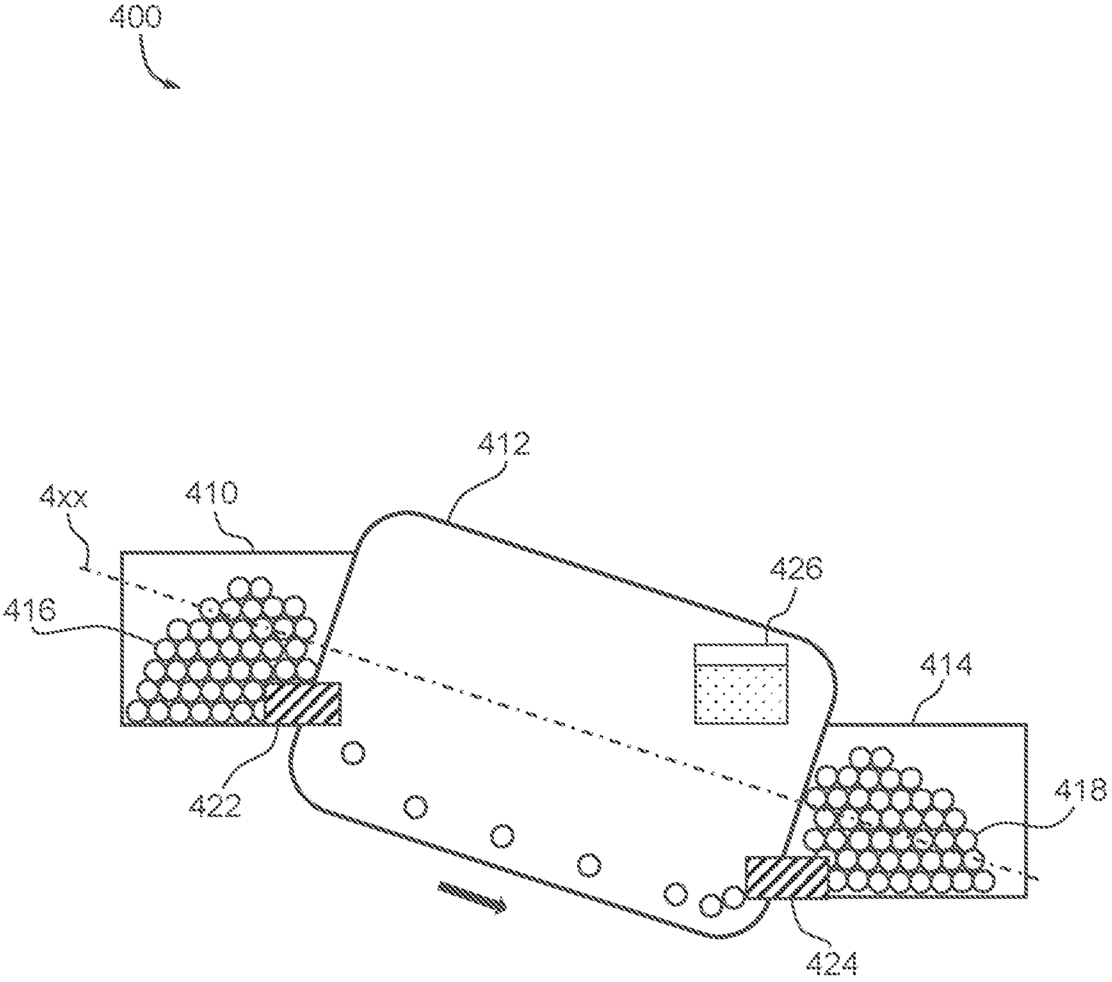
FIG. 4 is a diagram representing a fourth system for producing silicon carbide in accordance with various embodiments.

Referring now to FIG. 4, a fourth system 400 is provided for producing silicon carbide that includes a first container 410 configured to store a supply of graphite powder 416, a furnace 412 configured to be operated at elevated temperatures above the melting temperature of silicon and under vacuum conditions, and a second container 414 configured to receive a silicon carbide powder 418. A first auger 422 is configured to controllably transport the graphite powder 416 from the first container 410 to the furnace 412 and a second auger 424 is configured to controllably transport the silicon carbide powder 418 from the furnace 412 to the second container 414. During operation of the second system 400, the graphite powder 416 is input into the furnace 412 such that particles of the graphite powder 416 slide along interior surfaces of a rotating cylinder of the furnace 412 from an upper end thereof to a lower end thereof. While sliding, the particles react with silicon vapor within the cylinder to convert into particles of the silicon carbide powder 418. Preferably, the cylinder has a sufficient length such that the particles remain within the furnace 412 for a processing time sufficient to fully convert to the silicon carbide powder 418. Optionally, solid spheres or rods may be included within the rotating cylinder that are configured to refine the particle size and/or shape of the graphite powder 416 and/or silicon carbide powder 418 therein. The fourth system 400 includes a reservoir 426 configured to store a molten silicon in a manner such that the silicon vapor evaporating therefrom enters the cavity of the furnace 412. Although not shown, the reservoir 426 may include an inlet configured to receive silicon (e.g., a silicon powder) from a source thereof and a heating element configured to melt the silicon. With this arrangement, the graphite powder 416 may be continuously poured onto the rotating cylinder to continuously produce the silicon carbide powder 418.

The first, second, third, and fourth systems 100, 200, 300, and 400 may include various other components for the operation thereof, such as but not limited to various heating elements, outlets for reaction byproducts, such as carbon monoxide, control systems, etc. Such components are generally well known and therefore will not be discussed herein.

The first, second, third, and fourth systems 100, 200, 300, and 400 are described above as including the reservoirs 126, 226, 326, and 426 of molten silicon for producing and supplying the silicon vapor. Alternatively, the first, second, third, and fourth systems 100, 200, 300, and 400 may be configured to provide a silicon powder within the furnace 112, 212, 312, and 412 that is heated and evaporated to produce the silicon vapor. In some embodiments, the silicon powder may be mixed with the graphite powder 116, 216, 316, and 416. In such embodiments, an entirety of the silicon powder is evaporated within the furnace 112, 212, 312, and 412.

Figure 5:
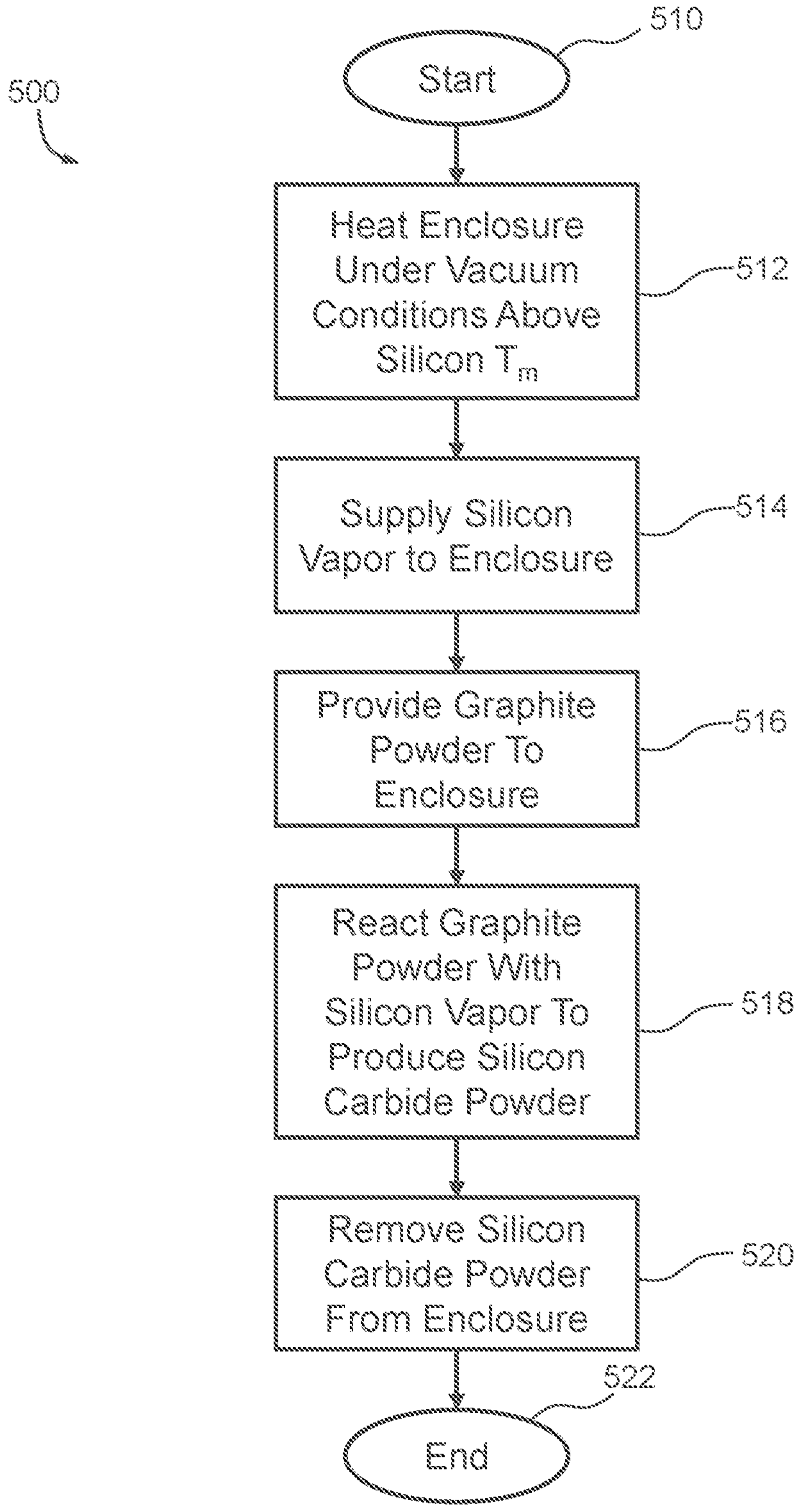
FIG. 5 is a flow diagram representing a method of producing silicon carbide in accordance with various embodiments.

With reference now to FIG. 5 and with continued reference to FIGS. 1-4, a flowchart provides a method 500 for producing silicon carbide as performed, for example, by one of the first, second, third, or fourth systems 100, 200, 300, or 400, in accordance with exemplary embodiments. As can be appreciated in light of the disclosure, the order of operation within the method 500 is not limited to the sequential execution as illustrated in FIG. 5, but may be performed in one or more varying orders as applicable and in accordance with the present disclosure.

In one example, the method 500 may begin at 510. At 512, the method 500 includes heating an enclosure to above the melting temperature (T m) of silicon under vacuum conditions. At 514, the method 500 includes supplying a silicon vapor to the enclosure. At 516, the method 500 includes providing a graphite powder to the enclosure. At 518, the method 500 includes reacting the graphite powder with the silicon vapor to produce a silicon carbide powder. At 520, the method 500 includes removing the silicon carbide powder from the enclosure. The method 500 may end at 522.

The systems and methods disclosed herein provide various benefits over certain existing systems and methods, such as the Acheson process. For example, the processing temperatures may be as low as, for example, about 1450° C. which is substantially lower than the temperature requirements of the Acheson process this providing significant cost savings and reduction of energy waste. In addition, a size of the furnaces 112, 212, 312, and 412 can be significantly smaller than those currently used in the Acheson process with processing batches that may potentially be a hundred times larger. In some examples, the furnaces 100, 200, 300, and/or 400 may be several meters long but with relatively small cavities. Such structures have been shown to convert the graphite powder into silicon carbide in less than one minute. This will allow for the hot reaction zone to be relatively small and therefore significantly improve the overall efficiency of the process. Furthermore, the sizes of the particles of the silicon carbide powder produced with this method may be easily controlled based on the size of the incoming graphite powder which is relatively easy to refine and control. As yet another benefit, an aspect ratio of the furnace may allow for adequate insulation and reduced heat loss.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:

an enclosure configured to be maintained under vacuum conditions and at a processing temperature above a melting temperature of silicon;

a vapor production system configured to supply a silicon vapor to the enclosure;

a transportation system configured to continuously provide a stream of graphite powder into the enclosure, retain the graphite powder within the enclosure for a processing time sufficient to react the graphite powder with the silicon vapor to produce a silicon carbide powder having a purity of at least 95 percent, and then continuously provide a stream of the silicon carbide powder out of the enclosure; and a collection system configured for collecting the silicon carbide powder as the stream thereof exits the enclosure.

2. The system of claim 1, wherein the vapor production system is configured to produce a volume of molten silicon in a reservoir that is in fluid communication with the enclosure.

3. The system of claim 1, wherein the transportation system is configured to cause the graphite powder to fall through the enclosure while the graphite powder is in contact with the silicon vapor to define a free-flowing stream of the graphite powder, wherein the reaction between the graphite powder and the silicon vapor occurs in-flight.

4. The system of claim 1, wherein the transportation system includes a chute, and the transportation system is configured to cause the graphite powder to slide along the chute within the enclosure while the graphite powder is in contact with the silicon vapor, wherein the reaction between the graphite powder and the silicon vapor occurs while the graphite powder is sliding down the chute.

5. The system of claim 1, wherein the transportation system includes a conveyor belt, and the transportation system is configured to cause the graphite powder to travel along the conveyor belt within the enclosure while the graphite powder is in contact with the silicon vapor, wherein the reaction between the graphite powder and the silicon vapor occurs while the graphite powder is traveling on the conveyor belt.

6. The system of claim 1, wherein the transportation system includes an apparatus configured to rotate the enclosure, and the transportation system is configured to cause the graphite powder to transition within the enclosure during rotation thereof from a first end of the enclosure to a second end of the enclosure while the graphite powder is in contact with the silicon vapor, wherein the reaction between the graphite powder and the silicon vapor occurs while the graphite powder is transitioning from the first end to the second end.

7. The system of claim 1, wherein the transportation system is configured to provide a stream of a silicon powder into the enclosure, the vapor production system is configured to melt the silicon powder within the enclosure to form molten silicon, and the transportation system is configured to retain the molten silicon within the enclosure until an entirety of the molten silicon evaporates to produce the silicon vapor.

8. The system of claim 1, wherein the system is configured to convert the graphite powder to the silicon carbide powder having a purity of at least 98 percent while within the enclosure, wherein the processing time is less than one minute.

9. The system of claim 1, wherein the processing temperature is between 141° and 1600° C.

10. The system of claim 1, wherein the vacuum conditions include a pressure of between 40 Pa and 6 Pa.

* * * * *